(12) United States Patent
Hankey

(10) Patent No.: US 7,669,911 B1
(45) Date of Patent: Mar. 2, 2010

(54) TARPING SYSTEM FOR TRUCK MOUNTED CONTAINERS

(76) Inventor: J. Daniel Hankey, P.O. Box 727, Durant, OK (US) 74702-0727

( * ) Notice: Subject to any disclaimer, the term of this patent is extended or adjusted under 35 U.S.C. 154(b) by 0 days.

(21) Appl. No.: 12/212,372

(22) Filed: Sep. 17, 2008

Related U.S. Application Data

(62) Division of application No. 11/358,381, filed on Feb. 21, 2006, now abandoned.

(51) Int. Cl.
*B60P 7/02* (2006.01)
(52) U.S. Cl. .............................. 296/100.1; 296/100.01; 296/100.17; 296/100.18; 298/23 R
(58) Field of Classification Search ............ 296/100.01, 296/100.02, 100.06, 100.1, 100.17, 100.16, 296/100.18, 101; 298/23 R
See application file for complete search history.

(56) References Cited

U.S. PATENT DOCUMENTS

| | | |
|---|---|---|
| 3,833,255 A | 9/1974 | Logue |
| 3,913,969 A | 10/1975 | Hoch |
| 4,378,188 A | 3/1983 | Hardwick |
| 4,627,658 A | 12/1986 | Vold et al. |
| 5,066,063 A | 11/1991 | Mullally |
| 5,076,174 A | 12/1991 | Martin |
| 5,275,459 A | 1/1994 | Haddad, Jr. |
| 5,340,187 A | 8/1994 | Haddad, Jr. |
| 5,498,066 A | 3/1996 | Cuthbertson et al. |
| 5,913,561 A | 6/1999 | Alcorn |
| 6,641,201 B1 | 11/2003 | Pietryga et al. |
| 6,695,382 B2 | 2/2004 | Ciferri et al. |
| 6,896,312 B2 | 5/2005 | Talbot |

FOREIGN PATENT DOCUMENTS

JP 356142718 A 11/1981

*Primary Examiner*—Joseph D Pape
(74) *Attorney, Agent, or Firm*—Gable & Gotwals

(57) ABSTRACT

A tarping system for removably covering the open top of a container resting on a platform of a truck frame, or directly on the truck frame, includes a cover support structure extending upwardly from the pivoted platform, a tarping frame displaceably secured to the cover support structure, a covering medium secured to the tarping frame and dimensioned to protectably cover the container open top, a power system extending between the cover support structure and the tarping frame for raising the tarping frame and thereby the covering medium above the container open top to permit the container to be removed from the truck frame.

7 Claims, 5 Drawing Sheets

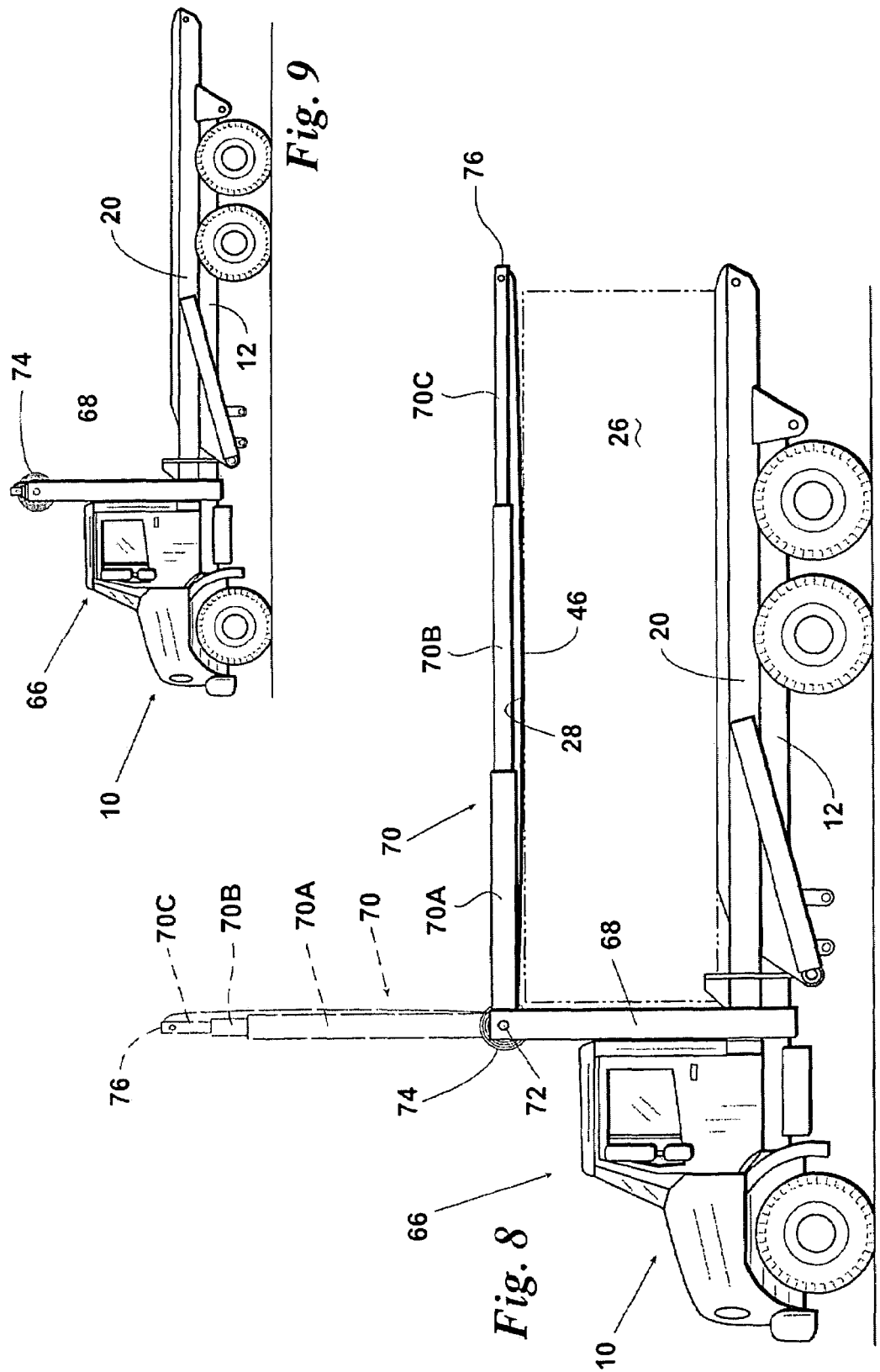

TARPING SYSTEM FOR TRUCK MOUNTED CONTAINERS

REFERENCE TO PENDING APPLICATIONS

This application is a divisional application of U.S. patent application Ser. No. 11/358,381, filed Feb. 21, 2006 now abandoned, and claims the benefit of that previously filed application.

REFERENCE TO MICROFICHE APPENDIX

This application is not referenced in any microfiche appendix.

FIELD OF THE INVENTION

The present invention relates to a tarping system for truck mounted containers and, more particularly, to an improved system for removably covering the top of a container when it is being transported by a truck.

BACKGROUND OF THE INVENTION

A common means of transporting bulk material is by the use of truck mounted containers. Such containers are typically metal, rectangular vessels that have a horizontal open top. The containers are positioned on the frame of a truck. One type, called a roll-off can be discharged from the truck by tilting of the frame allowing the container to slide off onto a support surface, such as the surface of the earth. Such containers are open top. In some instances they are filled after being positioned on a truck bed. It has become a government requirement in many jurisdictions that truck mounted containers be covered. This can be done by the truck operator manually spreading a tarp cover over the container open top and fastening it in place around the peripheral edges of the container so that the contents cannot be inadvertently displaced during transportation. Tarping by this manual method involves an operator climbing on top of the filled container which is sometimes 8 feet high when on the ground or 12 feet high when on a truck. The operator must carry the fabric cover or tarpaulin which typically is at least 10 feet wide by typically 25 feet long. The operator must spread the tarpaulin over the top and down the upper four sides of the container. The corners and edges are then fastened in place by the operator. It is easy to see that this manual procedure is dangerous since falls from the container can be extremely serious. Further, manual tarping is time consuming.

When the operator of a container carrying truck reaches the destination where the container or the contents thereof are to be discharged from the truck, the covering or tarp must be removed. Manually removing a covering can also be very time consuming. For these reasons a need exists for an improved, time efficient system for removably covering the open top of truck supported containers.

For background information relating to this subject matter, reference may be had to the following previously issued United States patents.

| Pat. No. | Inventor | Title |
| --- | --- | --- |
| 3,833,255 | Logue | Combined Load Cover and Windshield Protector For Dump Truck |
| 3,913,969 | Hoch | Tuck Body Closure |
| 4,378,188 | Hardwick | Cover Assembly For Receptacle Transporting Vehicle |
| 4,627,658 | Vold et al. | Power-Assisted Semi-Trailer Truck Body Top Cover |
| 5,066,063 | Mullally | Removable Cover For A Truck Cargo Box |
| 5,076,174 | Martin | Flexible Cover For Multiple Compartment Vehicles Having A Rigid Movable Frame and Lift Assisting Resilient Straps |
| 5,275,459 | Haddad, Jr. | Electrically Insulated Truck Cover Arm |
| 5,498,066 | Cuthbertson et al. | Articulated Cover For A Top Loading Hauling Body |
| 5,913,561 | Alcorn | Top Cover "Tarping" System For Roll-Off Container Trucks |
| 6,641,201 | Pietryga et al. | Convertible Bed Cover For A Vehicle |
| 6,896,312 | Talbot | Variable Height Covering System |
| Japan 356142718A | Kaneda Tomikichi | Device For Automatically Laying Tarpaulin Over Dump Truck |

BRIEF SUMMARY OF THE INVENTION

This invention concerns a tarping system for covering the open top of a container mounted on a truck. If the container is of the "roll-off" type a platform can be tilted to permit the container to slide off and on to the earth or other working surface. The tarping system includes a cover support structure that extends upwardly from the truck frame. A tarping frame is displaceably secured to the cover support structure and typically extends in a horizontal direction.

A covering medium, that is a flexible cover such as provided by a tarpaulin or the like, is secured to the tarping frame and dimensioned to protectably cover the open top of the container. A hydraulic system extends between the cover support structure and the tarping frame for raising the tarping frame and thereby the covering medium above the container open top to permit the container to slide off of the platform when the platform is tilted. In addition, the hydraulic system functions to raise the cover support structure when a container is being positioned on the platform. The hydraulic system is supplied by hydraulic pressure available from the truck on which the system is used and includes manual controls operatable by an operator by which the tarping frame is raised and lowered as required to receive a container onto a truck pivoted platform or to discharge the container from a platform and to permit the covering medium to be lowered onto the open top to substantially seal the open top against the inadvertent discharge of any contents when the tarping system is in the actuated condition, that is, in the condition in which the truck is employed for transporting the container from one location to another.

In a preferred arrangement the tarping frame is pivotally supported to the cover support structure about a horizontal axis so that the tarping frame is thereby pivotally displaceable relative to the truck platform to raise the covering medium above the container open top.

In another embodiment the tarping frame is telescopically extendable from a short length less than the length of the container to an extended length at least equal to the length of the container.

The cover support structure can be formed of at least two upwardly extending structures secured to each opposed side edge of the truck platform and wherein the tarping frame is raised and lowered in a substantially horizontal relationship to cover and uncover the container open top.

A better and more complete understanding of the invention will be obtained from the following detailed description of the preferred embodiments taken in conjunction with the drawings and the attached claims.

BRIEF DESCRIPTION OF THE DRAWINGS

FIG. 8 is an elevational side view of a truck having a container thereon shown in dotted outline. A tarping frame in the form of a stationary post is affixed to and extends upwardly from the truck frame, immediately behind the truck cab. A telescopic cover support structure extends horizontally from the post, the cover support structure carrying a covering medium that covers the open top of the container.

FIG. 9 is an elevational side view of the truck of FIG. 8 with the container removed and with the tarping frame telescopically fully retracted.

DETAILED DESCRIPTION OF THE PREFERRED EMBODIMENTS

It is to be understood that the invention that is now to be described is not limited in its application to the details of the construction and arrangement of the parts illustrated in the accompanying drawings. The invention is capable of other embodiments and of being practiced or carried out in a variety of ways. The phraseology and terminology employed herein are for purposes of description and not limitation.

Elements shown by the drawings are identified by the following numbers:

| | |
|---|---|
| 10 | truck |
| 12 | frame |
| 14 | cab |
| 16 | forward wheels |
| 18 | rearward wheels |
| 20 | platform |
| 22 | horizontal axis |
| 24 | platform hydraulic system |
| 26 | roll-off container |
| 28 | open top |
| 30 | cover support structure |
| 32 | post |
| 34 | telescopic upper post portion |
| 36 | hydraulic cylinder/piston |
| 38 | upper end of 34 |
| 40 | tarping frame |
| 42A-C | telescoping sections |
| 44 | cylinder/piston |
| 46 | covering medium |
| 48 | roller |
| 50 | axis |
| 52 | outer end |
| 54A-D | posts |
| 56A-B | telescopic post portions |
| 58A-B | cylinder/piston |
| 60 | tarping frame |
| 62 | hinged portion |
| 64 | cylinder/piston |
| 66 | stationary cover support structure |
| 68 | stationary post |
| 70 | post telescopic assembly |
| 72 | axis |
| 74 | tarping material |
| 76 | upper end |
| 78 | dump truck |

-continued

| 80 | dump container |
| 82 | axis |
| 84 | open top |
| 86 | post |
| 88 | cover support structure |
| 90 | cylinder/piston |

Figure 1:
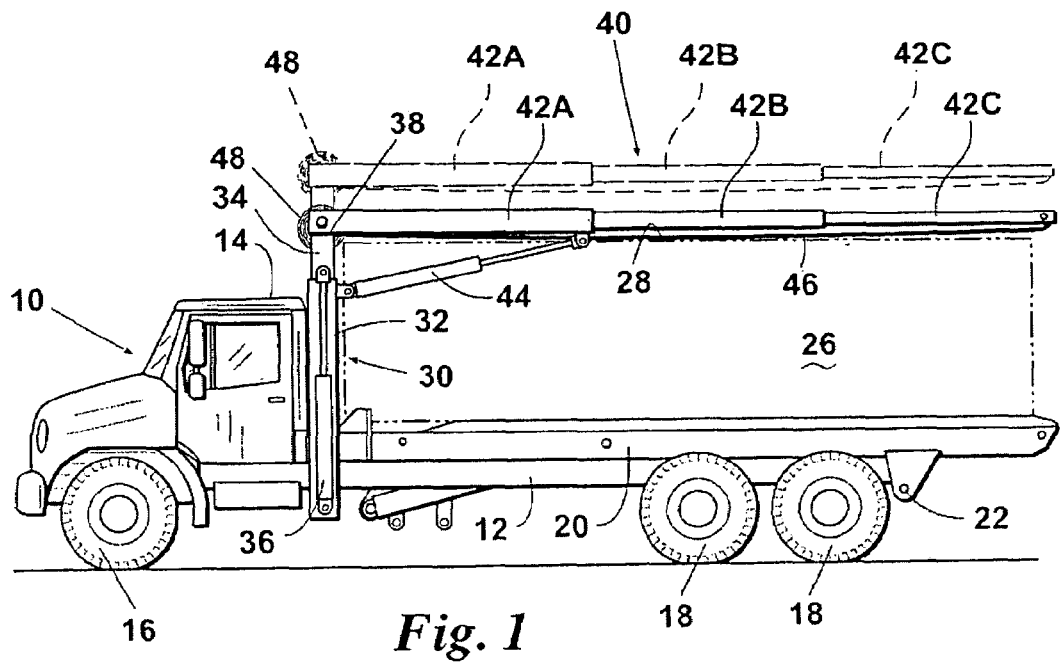
FIG. 1 is an elevational side view of a truck having a truck frame and a tiltable platform. Resting on the platform is an open top container frequently referred to as a "roll-off container". The invention provides a tarping system for selectably covering the container's open top. The tarping system includes a cover support structure, a tarping frame, a covering medium and a power system as will be set forth in the detailed description of the invention.
Figure 2:
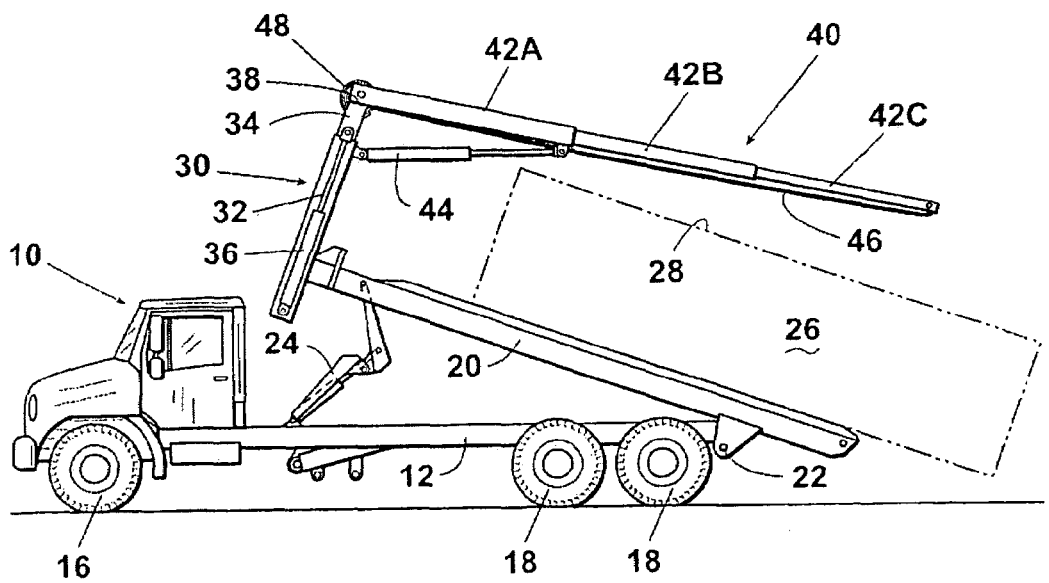
FIG. 2 is an elevational side view of the truck frame, tiltable platform, a container and a tarping system as shown in FIG. 1 but showing the frame tilted to cause the container to slide off of the platform if it is a roll-off type of container. The tarping frame is upwardly pivoted relative to the support structure so that it does not interfere with the discharge of the container.

Referring to the drawings and first to FIG. 1, a container truck is generally indicated by the numeral 10. The invention herein will first be described as it can be used with a roll-off container truck, it being understood that a roll-off container is an example of one type of container to which this invention pertains. Truck 10 includes a frame 12 that supports a cab 14 in which the driver sits. Frame 12 has forward wheels 16 and rearward wheels 18. Pivotally supported on frame 12 is a platform 20 that is pivoted about a horizontal axis 22 by a platform hydraulic system 24 that is not seen in FIG. 1 but is seen in FIG. 2.

Positioned on the top surface of platform 20 is, by way of example, a roll-off container 26. Container 26 is typically made of metal, is rectangular and has an open top 28. The invention of this disclosure is essentially concerned with a tarping system for removably covering the container open top 28.

Affixed to a forward end of platform 20 is a cover support stricture generally indicated by the numeral 30. Cover support structure 30 includes spaced apart vertical posts 32, only one of which is seen in FIGS. 1 and 2. Each of the posts 32 is secured to a forward end of platform 20. Each post 32 includes a telescopic upper portion 34. A hydraulic cylinder/piston 36 has a lower end secured to post 32 and an upper end to telescopic upper post portion 34. Thus by means of hydraulic cylinder/piston 36 the height of the upper end 38 of the cover support structure can be elevationally changed with respect to platform 20.

Pivotally secured to the upper end 38 of telescopic upper post portion 34 is the inner end of a tarping frame generally indicated by the numeral 40. As shown in FIGS. 1 and 2 tailing frame 40 includes three telescoping sections 42A, 42B and 42C. More or less telescoping sections may be employed. The position of tarping frame 40 relative to horizontal is controlled by a cylinder/piston 44, one end of which is pivotally attached to post 32 and the other end to telescoping section 42A. As shown in FIG. 2, the tarping frame is upwardly pivoted by extension of cylinder/piston 44 so that the tarping frame is spaced away from the open upper end 28 of container 26. This permits container 26 to be safely loaded or unloaded from platform 20.

FIG. 1 shows in solid outline the tarping frame 40 horizontally positioned above the open top 28 of container 26 and shows a covering medium 46 stretched over the open top 28 of the container in a position so that when the tarping frame 40 is reduced in elevation by means of hydraulic cylinder/piston 36, the top of the container is fully covered to prevent any material therein from being inadvertently dislodged. FIG. 1 shows the tarping frame sections 42A, 42B and 42C in dotted outline as the elevation of the tarping frame has been increased, employing hydraulic cylinder/piston 36.

When the telescoping sections 42A, 42B and 42C are retracted, the covering medium 46 is wound on a roller 48. Roller 48 can be controlled by a hydraulic motor (not seen) to allow covering medium 46 to be rolled or unrolled as required by the extensions of telescoping sections 42A, 42B and 42C. Instead of a hydraulic motor an electrically driven motor may be employed or the motor device may be operated by air or gas pressure or may be spring actuated.

Figure 3:
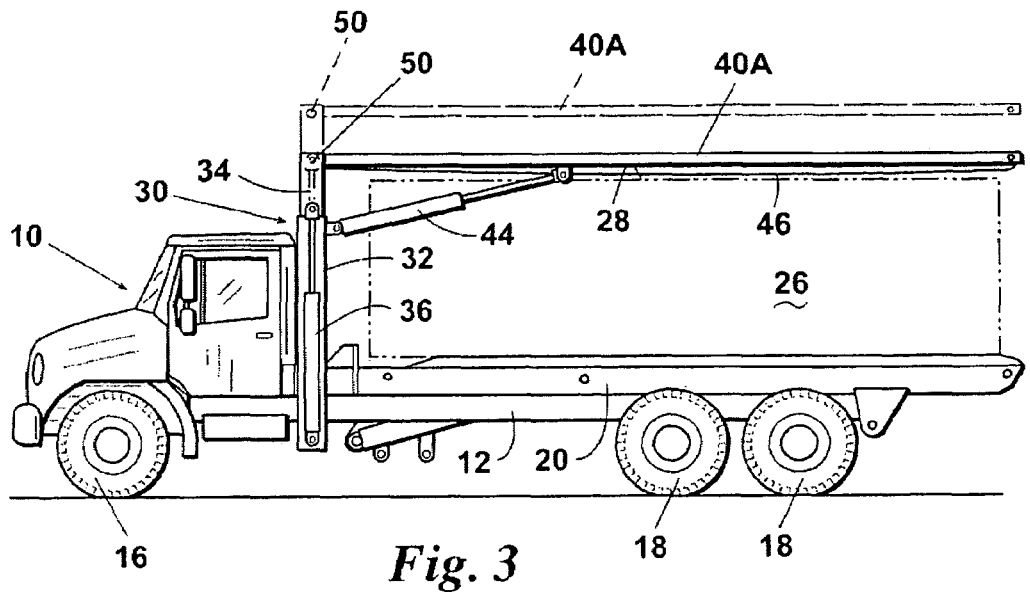
FIG. 3 is an elevational side view of a truck frame having a pivoted platform and a container as shown in FIGS. 1 and 2 but showing a tarping system in which the tarping frame has a fixed length.
Figure 4:
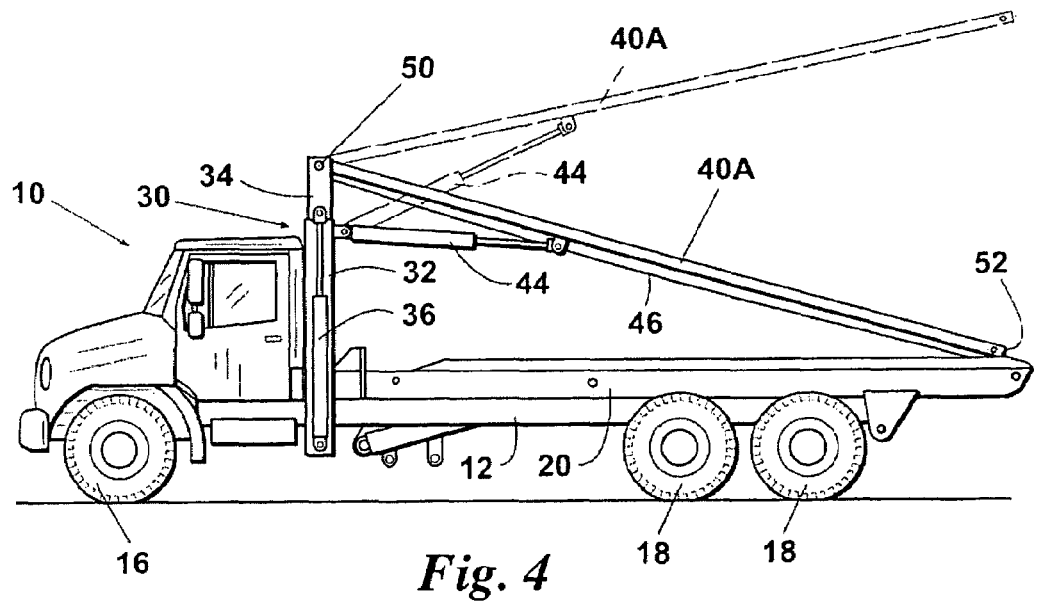
FIG. 4 shows the truck of FIG. 3 with the container having been removed from the truck. This view shows various positions of the tarping frame. In a dotted outline the tarping frame is shown pivoted upwardly as in the position when a container is being positioned onto or removed from the truck platform. In a second position the tarping frame is pivoted downwardly so that the outer end thereof rests on the truck platform.

FIGS. 3 and 4 show an alternate arrangement of the system of FIGS. 1 and 2 that is different in that the tarping frame 40A is of a fixed length. That is, the tarping frame 40A of FIGS. 3 and 4 does not telescope. FIG. 3 shows a container 26 in dotted outline resting on platform 20 of truck 10. In solid outline in FIG. 3 the tarping frame is positioned horizontally of and immediately above the open top 28 of container 26. In this position, when the telescopic upper post portion 34 is reduced in elevation by actuation of hydraulic cylinder/piston 36, the covering medium 46 contacts and fully covers container open top 28. In dotted outline the tarping frame 40A of FIG. 3 is shown elevationally raised above container open top 28 by the use of hydraulic cylinder/piston 36. The position of the tarping frame 40A shown in dotted outline in FIG. 3 permits positioning container 26 onto or removing it from truck 10. Tarping frame 40A is pivotally affixed to the upper end of telescoping upper post portion 34 to pivot about an axis 50. To provide further clearance for moving a container on or off truck 10, the tarping frame 40A can be tilted upwardly by means of hydraulic cylinder/piston 44. An upwardly tilted position of tarping frame 40 is shown in dotted outline in FIG. 4.

FIGS. 3 and 4 show tarping frame 40A being pivoted about axis 50 by action of a cylinder/piston 44. Instead of a rearwardly extending cylinder/piston 44 as shown, the tarping frame 40A could be lengthened forwardly of axis 50 providing an attachment point located over the cab of truck 10. In this way a cylinder/piston (not shown) could be affixed between the forward end of such attachment point of tarping frame 44 and post 32. In addition, a single cylinder/piston could be used, mounted on the centerline of truck 10 to simultaneously pivot both sides of tarping frame 40A so that the hydraulic system to pivot tarping frame 40A does not add to the width of truck 10. Stated another way, the particular mechanical method employed to tilt tarping frame 40A is not a critical aspect of the tarping system.

Unlike FIGS. 1 and 2, the embodiment of FIGS. 3 and 4 does not require provision for rolling or unrolling the covering medium 28.

FIG. 4 shows, in solid outline, tarping frame 40A in a rest position. That is, where cylinder/piston 44 is retracted so that the outer end 52 of tarping frame 40A is resting on truck platform 20. This provides a convenient location for the tarping frame 40A when there is no container on the truck and particularly when the truck is being moved from one location to another.

Figure 6:
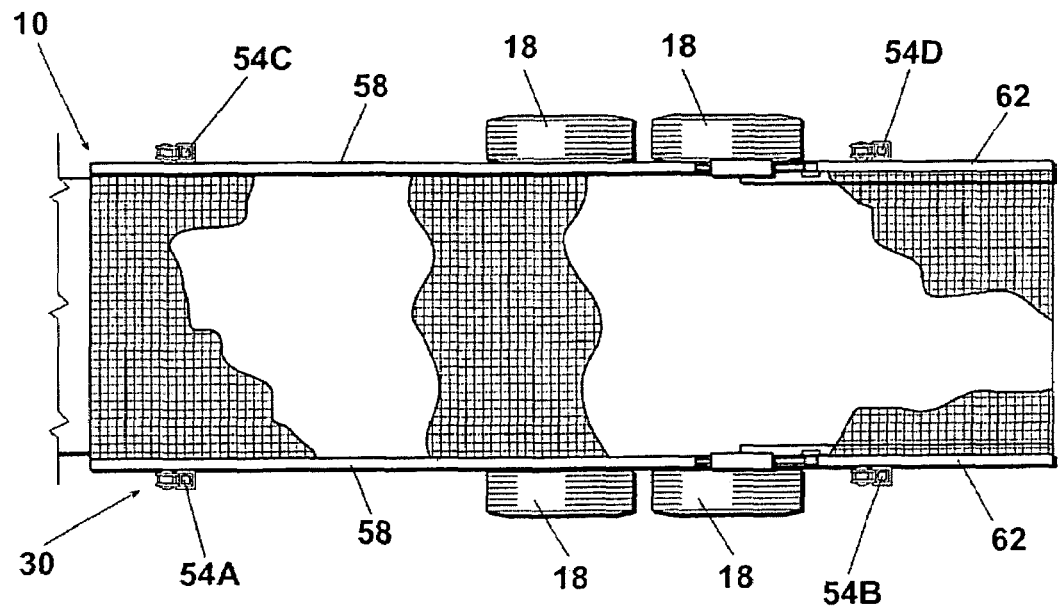
FIG. 6 is a top view taken along the line 6-6 of FIG. 5 showing the covering medium spread over the open top of the container.
Figure 5:
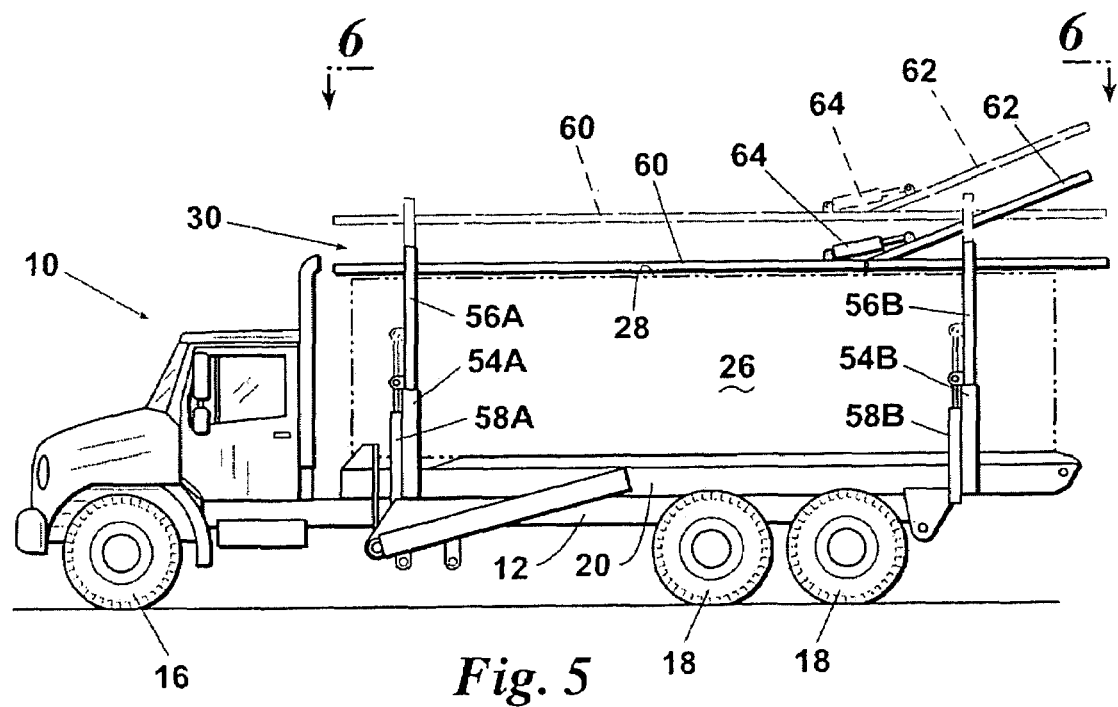
FIG. 5 is an elevational view of an alternate embodiment of the invention. In the embodiment of FIG. 5, the tarping frame consists of four support structures that extend from adjacent the four corners of the truck platform. In dotted outline in FIG. 5 a horizontally positioned tarping frame extends above the container open top. In solid outline the tarping frame is in a lower position adjacent the container open top. The tarping frame is elevationally moved downwardly to close the top of the container.
Figure 7:
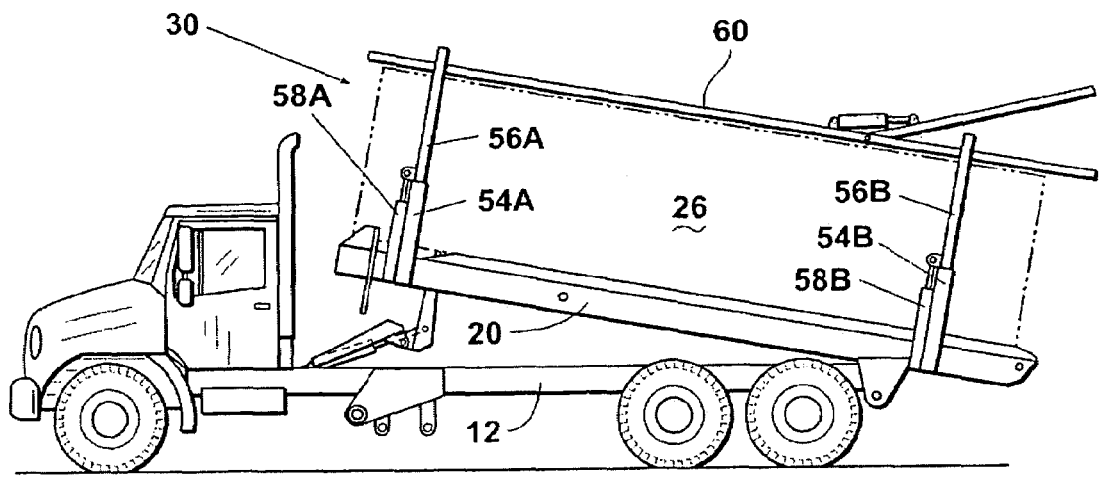
FIG. 7 is an elevational side view of a truck with a container and a tarping system as illustrated in FIGS. 5 and 6. In this view the truck platform is in the process of being pivoted to slide the container off of the truck platform. A rearward section of the tarping frame is upwardly pivoted to reduce the possibility of the tarping frame interfering with removal of the container.

FIGS. 5, 6 and 7 show an embodiment of the invention that is substantially different from that shown in FIGS. 1 through 4. In this embodiment the cover support structure is in the form of four vertically positioned telescoping posts 54A, 54B, 54C and 54D. Post 54A has a telescopically upwardly extendable portion 56A. In like manner, each of posts 54A-54D includes a corresponding upwardly extendable post portion although only portions 54A and 54B are seen. The telescoping upper portions 56 of each post 54 is controlled by a hydraulic cylinder/piston 58. While only cylinder/pistons 58A and 58B are seen in FIGS. 5 and 7, it is understood that each of the four posts 54 and telescopically extendable post portions 56 include a cylinder/piston 58 by which the extendable portions are elevationally controlled.

A tarping frame 60 as shown in solid outline in FIGS. 5, 6 and 7 and is secured to the upper ends of telescopic post portions 56. In this manner the elevational position of tarping frame 50 relative to truck platform 20 is elevationally controllable by the simultaneous control of each of the four cylinder/pistons 58.

FIG. 5 shows the tarping frame 60 in solid outline in a lower position extending above the open top 28 of roll-off container 26. Though not seen in the drawings, a flexible covering medium is secured by tarping frame 60 to cover the open top when the tarping frame is in a lower position. In dotted outline the tarping frame 60 is elevationally raised such as can be achieved by actuation of cylinder/pistons 58. In this elevated position of the tarping frame container 26 can be positioned onto or removed from truck platform 20.

The embodiment of FIGS. 5 and 6 shows the arrangement wherein tarping frame 60 has, at the rearward end thereof, a hinged portion 62. Each hinged portions 62 can be pivoted at an upward angle by a hydraulic cylinder/piston 64. By the provision of hinged portions 62 the tarping frame 60 does not have to be elevated as much to allow a container to slide beneath it when the container is being discharged from truck platform 20.

In each of the embodiments shown in FIGS. 1 through 6 the cover support structure is affixed and moves with platform 20. In contrast, in FIGS. 8 and 9, the cover support structure is secured to truck frame 12. That is, in the embodiment of FIGS. 8 and 9 the cover support structure, generally indicated by numeral 66, is stationary. By stationary it is meant that the cover support structure 66 is mounted to the vehicle frame 12 whereas in FIGS. 1-6 the cover support structure 30 is mounted to and moves with platform 20 which is pivotally supported to truck frame 12. As seen in FIGS. 8 and 9 each stationary post 68 is secured at its lower end to frame 12. Thus, in FIGS. 8 and 9, platform 20 pivots with respect to frame 12 and with respect to posts 68. A post telescopic assembly, generally indicated by the numeral 70, formed of telescoping portions 70A, 70B and 70C, is pivoted to the upper end of each stationary post 68. Each post telescopic assembly pivots about an axis 72 so that each telescoping assembly can be pivoted from a vertical relationship to post 68 as shown in dotted outline in FIG. 8, to a horizontal relationship as shown in solid outline in FIG. 8. Coiled about axis 72 is a roll of tarping material 74 that is rolled on a rotationally spring biased roller so that the tarping material extends out to the end of post telescopic assembly 70. The post telescopic assembly 70 may be rotated to the horizontal position as shown in solid outline in FIG. 8 and then telescopically extended so that the covering medium 46 is stretched to extend over the open top 28 of container 26.

When use of the covering medium is not required, it can be stowed by aligning the post telescopic assembly 70 with stationary post 68 and withdrawing the assembly into the interior of post 68, the tarping material being simultaneously wound on the roll about axis 72 as shown in FIG. 9. FIG. 9 shows the stationary cover support structure in a stowed position and with the tarping material wound on rollers 74 and thereby platform 20 of the truck 10 ready to receive a roll-off container thereon.

Figure 10:
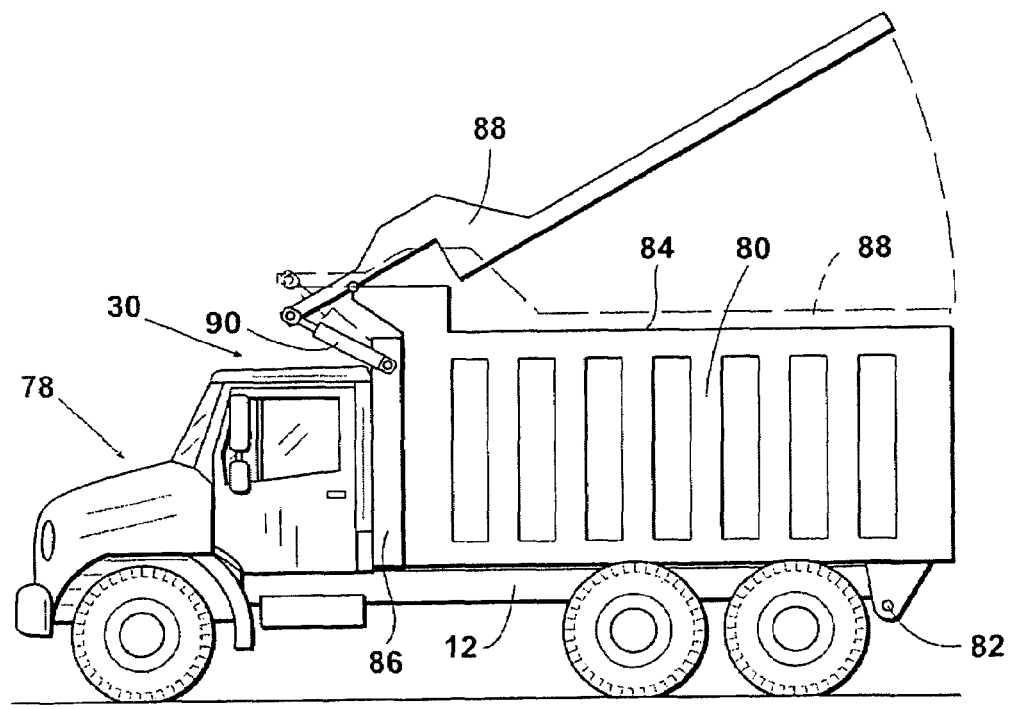
FIG. 10 is an elevational side view of a dump truck having an open top dump container pivotally affixed to the truck frame. A pivotal cover support structure that moves with the dump container can be pivoted to open or close the dump container open top.

FIG. 10 shows an application of the concepts of the present invention to a different type of truck. FIGS. 1 through 9 show, by way of example, a system of this invention as applied to a truck specifically adapted to transport a roll-off container including a tilting platform 20 for receiving a roll-off container thereon. In FIG. 10 truck 78 is illustrated which is a typical dump truck type, that is, it does not provide for receiving a roll-off container. Instead in FIG. 10 truck 78 has a frame 12 and pivotally mounted to the frame 12 is a dump container 80. Dump container 80 pivots to frame 12 about an axis 82. In the horizontal position as shown in FIG. 10 dump container 80 can receive loose material therein. When the material within dump container 80 needs to be discharged, the container is pivoted about axis 82. Dump container 80 typically includes a rearward gate (not seen) that opens when the dump container 80 is pivoted upwardly about axis 82 so that loose material therein slides out of the container.

FIG. 10 shows a cover support structure generally indicated by numeral 30 that is similar to that illustrated in FIGS. 1 through 5. A post 86 is secured to the dump container 80. Pivotally secured to the upper forward edge of dump container 80 is a cover support structure 88 that extends to fully cover the open top 84 of dump container 80 when it is in the downward, horizontal position as shown in dotted outline in FIG. 10. A hydraulic cylinder/piston 90 extends between post 86 and a forwardly extending portion of cover support structure 88 so that pivotation of the cover support structure is controlled hydraulically.

In the system of FIG. 10, an operator of the dump truck can cover or uncover the open top 84 of dump container 80 even without having to get out of truck 78, thus saving the considerable time normally required for manually covering the open top of a dump truck body and for uncovering it when dumping the container.

The tarp cover 46, 74 may be fully attached to a complete frame perimeter or may be attached only at opposed ends, and be full extended and retracted forwardly and rearwardly wherein the sides are supported only by elastic (not shown) sewn into the tarp cover.

In these specifications reference has been made to platform hydraulic system 24, hydraulic cylinder/piston 36, cylinder/piston 44, cylinder/pistons 58A and 58B, cylinder/piston 64 and cylinder/piston 90. These are illustrated and described as hydraulic devices that typically employ hydraulic fluid under pressure to move a piston in a cylinder to perform work. However, such a system can be air operated, electrically operated, spring power operated, compressed gas operated and the like. Therefore, "hydraulic system" and "cylinder/piston" as used in the specification and claims are intended to be inclusive of any kind of known device for providing controllable force for physically moving one object relative to another object.

In practicing the invention a cover support structure 30 that positions a tarping frame 40 and covering medium 46 can be mounted to the truck frame 12, the truck platform 20 or the dump container 80.

The covering medium 46, which can also be called a tarp cover, can be supported around the full perimeters thereof by tarping frame 40 or the covering medium may be supported only on front and rearward ends, such as shown in FIGS. 1 and 2.

The invention herein, including the various embodiments, provide for systems wherein open top containers, such as roll-off containers, dump truck body containers and so forth can be expeditiously covered or uncovered by a truck operator without the time consuming and dangerous effort that is involved in manually placing a cover over material that is being transported.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. For use with a truck having a frame and having a platform pivotally supported to the frame, the platform being pivoted by a platform hydraulic system, and a container having an open top resting on the platform, a tarping system for removably covering the open top comprising:
 a cover support structure extending upwardly from the platform and moved with said platform when said platform is pivoted;
 a tarping frame displaceably secured to said cover support structure wherein said tarping frame includes a first position substantially parallel to said platform and a second position at an angle with respect to said platform;
 a covering medium rigidly affixed to said tarping frame along a longitudinal edge of said tarping frame and dimensioned to protectably cover said open top; and
 a hydraulic system extending between said cover support structure and said tarping frame for elevationally positioning said tarping frame and thereby said covering medium relative to said open top;
 said cover support structure including at least two upwardly extending structures secured to each opposed side edges of said platform, said tarping frame being raised and lowered in a substantially parallel relationship to the platform to cover and uncover said open top.

2. A tarping system according to claim 1 wherein said tarping frame is pivotally supported to said cover support structure about a horizontal axis, said tarping frame being thereby pivotally and elevationally displaceable relative to said container.

3. A tarping system according to claim 1 further comprising said container rolls off said platform when said platform is tilted relative to said truck frame.

4. A tarping system according to claim 1 further comprising said covering medium being a flexible cover.

5. For use with a truck having a frame, a remotely operable tarping system comprising:
 a platform pivotally supported to the frame, said platform being pivoted by a platform hydraulic system;
 a container having an open top and resting on said platform;
 a cover support structure extending upwardly from said platform and moved with said platform;
 a tarping frame displaceably secured to said cover support structure;
 a covering medium secured to said tarping frame and dimensioned to protectably cover said open top; and
 a remotely actuatable hydraulic system extending between said cover support structure and said tarping frame for elevationally positioning said tarping frame and thereby said covering medium to cover said open top;
 said cover support structure including at least two upwardly extending structures secured to each opposed side edges of said platform, said tarping frame being raised and lowered in a substantially parallel relationship to the platform to cover and uncover said open top.

6. A remotely operable tarping system according to claim 5 further comprising said tarping frame being pivotally supported to said cover support structure about a horizontal axis, said tarping frame being thereby pivotally and elevationally displaceable relative to said open top.

7. A remotely operable tarping system according to claim 5 further comprising said tarping frame including a first portion that remains substantially parallel to said platform and a second portion that is pivotally displaceable with respect to said platform.

* * * * *